United States Patent [19]
Scott

[11] Patent Number: 5,612,668
[45] Date of Patent: Mar. 18, 1997

[54] VEHICLE SITE PROTECTION SYSTEM

[75] Inventor: Peter Scott, Norwich, United Kingdom

[73] Assignee: Forecourt Security Developments Limited, Norwich, United Kingdom

[21] Appl. No.: 75,464

[22] PCT Filed: Dec. 10, 1991

[86] PCT No.: PCT/GB91/02193

§ 371 Date: Jul. 22, 1993

§ 102(e) Date: Jul. 22, 1993

[87] PCT Pub. No.: WO92/10387

PCT Pub. Date: Jun. 25, 1992

[30] Foreign Application Priority Data

Dec. 11, 1990 [GB] United Kingdom ............... 9026853
Mar. 7, 1991 [GB] United Kingdom ............... 9104798

[51] Int. Cl.⁶ ............................................. G08B 13/00
[52] U.S. Cl. ..................... 340/426; 340/429; 340/541; 340/825.49
[58] Field of Search ........................ 340/426, 429, 340/540, 541, 545, 825.49, 825.36; 307/10.2; 180/287

[56] References Cited

U.S. PATENT DOCUMENTS

| | | | |
|---|---|---|---|
| 3,710,371 | 1/1973 | Whalen et al. | 340/429 |
| 3,864,675 | 2/1975 | Colibert | 340/429 |
| 4,067,411 | 1/1978 | Conley et al. | 340/426 |
| 4,167,733 | 9/1979 | Krause et al. | 340/546 |
| 4,187,497 | 2/1980 | Howell et al. | 340/429 |
| 4,284,973 | 8/1981 | Howell et al. | 340/429 |
| 4,821,309 | 4/1989 | Namekawa | 379/58 |
| 4,990,890 | 2/1991 | Newby | 340/426 |
| 5,319,698 | 6/1994 | Glidewell et al. | 340/541 |
| 5,373,282 | 12/1994 | Carter | 340/426 |

FOREIGN PATENT DOCUMENTS

| | | |
|---|---|---|
| 366378 | 5/1990 | European Pat. Off. . |
| 3918052 | 11/1990 | Germany . |
| 3908029 | 11/1990 | Germany . |
| 2202067 | 12/1987 | United Kingdom . |
| 2198270 | 6/1988 | United Kingdom . |
| 2218243 | 4/1989 | United Kingdom . |
| 2220778 | 1/1990 | United Kingdom . |

OTHER PUBLICATIONS

International Search Report for PCT/GB91/02193.

Primary Examiner—Jeffery Hofsass
Assistant Examiner—Edward Lefkowitz
Attorney, Agent, or Firm—Galgano & Burke

[57] ABSTRACT

A vehicle protection system comprises a sensor, a transmission unit, a control unit and an alarm signalling unit. The sensor is mountable on and capable of detecting interference with a vehicle, and the transmission unit is also mountable on the vehicle and is activated in response to detection by the sensor of interference with the vehicle to transmit a signal to the control unit. The control unit is located remotely from the vehicle and is arranged to activate the alarm signalling unit in response to receipt of the signal, there being no physical connection between the control unit and the transmission unit.

12 Claims, 3 Drawing Sheets

VEHICLE SITE PROTECTION SYSTEM

FIELD OF THE INVENTION

The invention relates to vehicle protection systems.

BACKGROUND TO THE INVENTION

In many instances where vehicles are left in areas to which the public have relatively easy access, there exist the dual problems of firstly theft of or from the vehicles, and secondly damage to the vehicles. It is now common to use a so-called "car alarm" in certain vehicles which may be sensitive to an intrusion (using, for instance, an ultrasonic detector) but these have several limitations: (1) due to the high number of false alarms they are often ignored; (2) they are difficult to install and remove quickly from a variety of vehicles; (3) they do not allow for centralised control of a number of such alarms; and (4) they are of little use in areas that are relatively sparsely populated.

There is, therefore, a clear need for an improved vehicle protection system.

SUMMARY OF THE INVENTION

According to the present invention, there is provided a vehicle site protection system for use in protecting a plurality of parked vehicles on said site from interference, the system comprising a control unit located on or at the periphery of said site and arranged to activate an alarm signalling means in response to receipt of a signal from one of a plurality of sensor units, each sensor unit being positioned in a respective one of the vehicles, each sensor unit comprising a sensor and a transmission means activatable to send a signal to the control unit in response to output from the sensor, there being no physical connection between the control unit and the transmission means, characterised in that each sensor unit is self-contained and self-powered and comprises a shock sensor and a sensor capable of detecting motion of an object within the vehicle.

The invention will now be described, by way of example only, with reference to the drawings that follow; in which:

DESCRIPTION OF THE PREFERRED EMBODIMENTS

Figure 1:
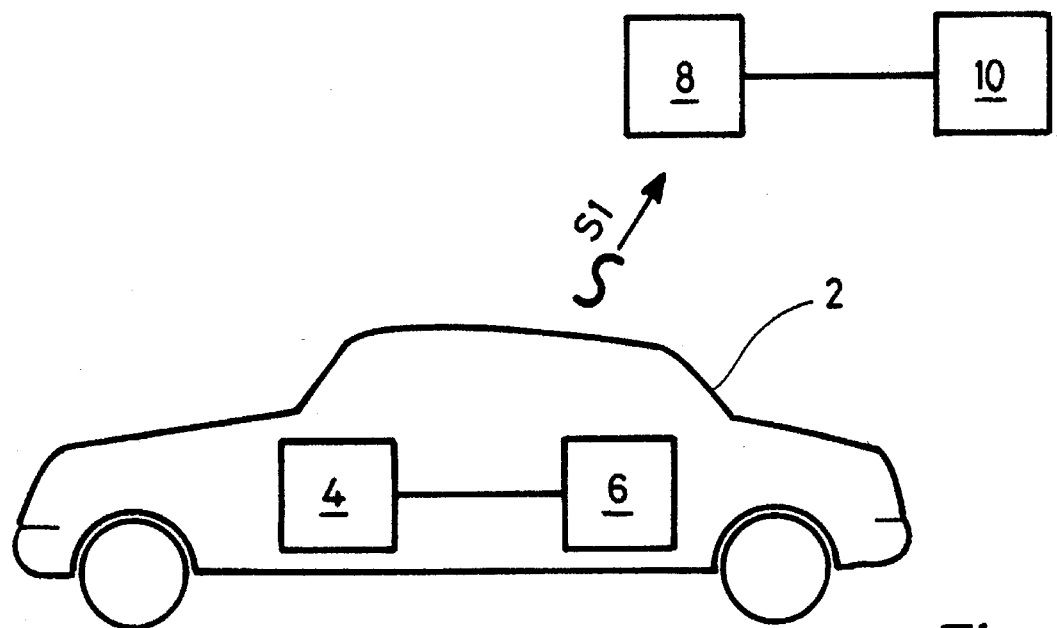
FIG. 1 is a schematic representation of the present invention in use.

Referring now to FIG. 1, there is shown a vehicle 2 on which is mounted a sensor 4, which is itself connected to a transmission means 6 also mounted on the vehicle 2. In this case the sensor 4 and the transmission means 6 are mounted within the vehicle 2. Although the vehicle 2 shown is clearly a car, the invention is applicable to other vehicles such as motor cycles, boats, caravans, plants etc.

Also shown schematically in FIG. 1 is a control unit 8 and an alarm 10. The alarm 10 may be any device or means intended to attract attention to the vehicle 2, examples of suitable alarms 10 will be given below.

Figure 2:
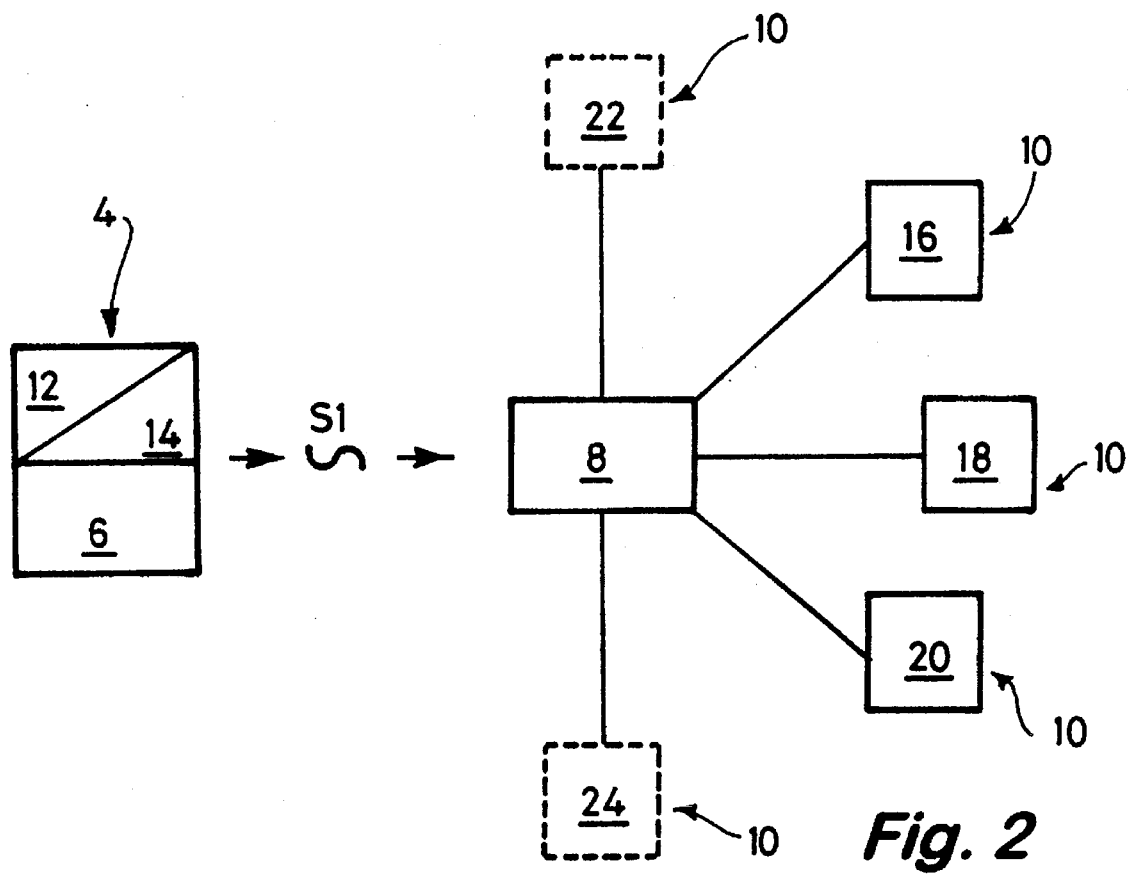
FIG. 2 is a block diagram representing the configuration and operation of the present invention.
Figure 3:
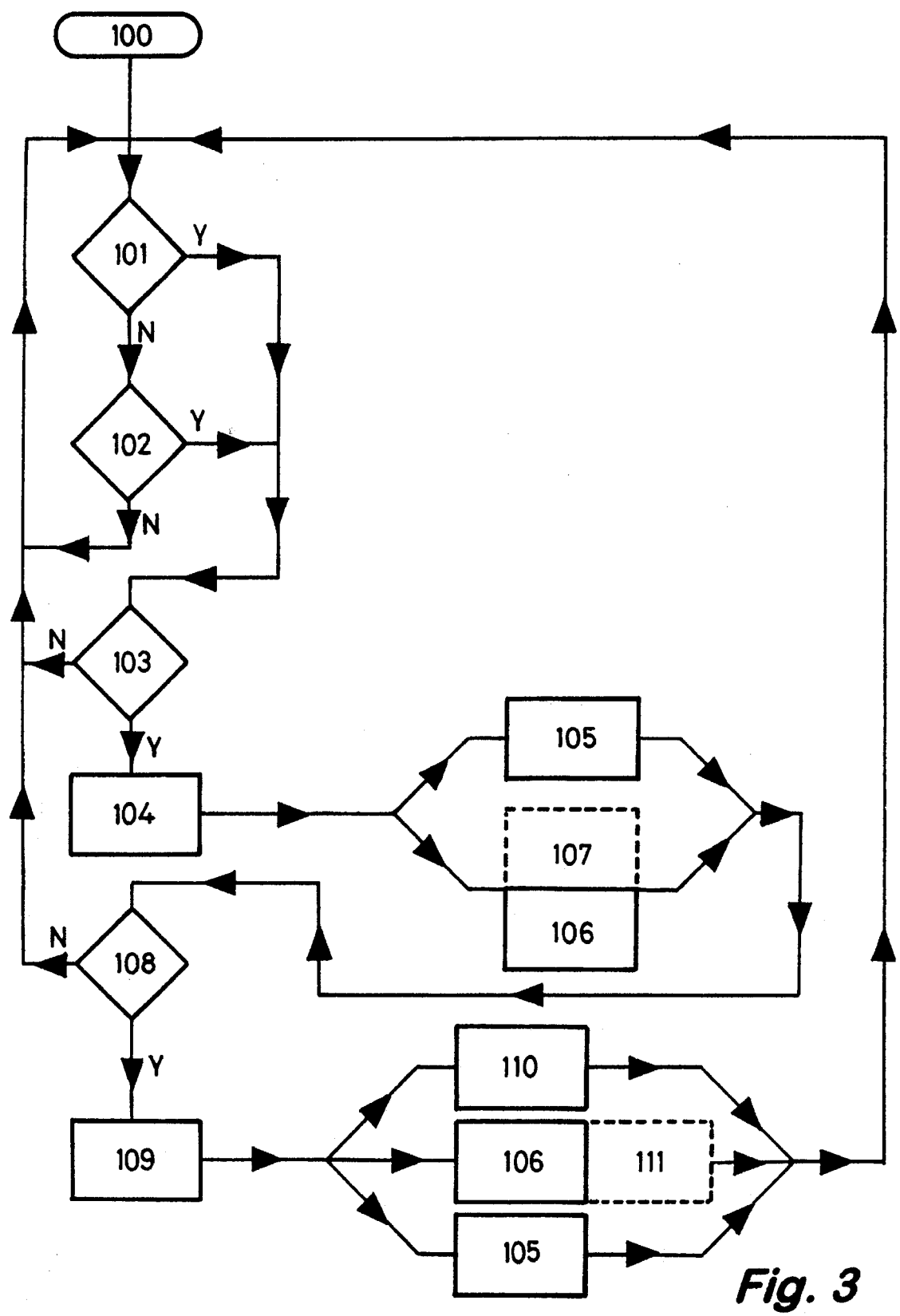
FIG. 3 is a flow diagram also representing the operation of the present invention.

FIG. 2 shows the preferred construction of the system in block diagram form. FIG. 3 explains the operation of the system in flow diagram format which may be understood with reference to the key set out below.

| KEY | |
| --- | --- |
| 100- | START |
| 101- | Has the ultrasonic scanner 12 detected an interference? |
| 102- | Has the piezo-crystal sensor 14 detected an interference? |
| 103- | In the control unit 8 armed? |
| 104- | Activate first-stage alarm. |
| 105- | Activate siren 16. |
| 106- | Activate stroboscopic light source 18. |
| 107- | Activate vocal alarm through speakers 22. |
| 108- | Has another interference been detected within the first pre-set time period? |
| 109- | Activate second-stage alarm. |
| 110- | Activate auto-dialler 20. |
| 111- | Activate 2kW lighting source 24. |

The sensor 4 includes a detector of movement within the vehicle 2, such as an ultrasonic scanner 12, and a shock and motion detector, such as a piezo-crystal sensor 14 which can be set to be capable of detecting scratches due to the vibrations they cause in the vehicle bodywork and is also capable of detecting other interferences with the vehicle 2 of a mechanical nature. Thus, in combination, the ultrasonic scanner 12 and the piezo-crystal sensor 14 (which together constitute the sensor 4) are between them capable of detecting interference with the outside of the vehicle 2 such as scratching or denting, etc; and interference with the inside of the vehicle 2 such as the movement of a person therein or the motion of glass fragments from a broken window, etc.

The sensitivity of the ultrasonic scanner 12 and/or the piezo-crystal sensor 14 can be adjusted to achieve a balance between the level of security achieved with the system and the occurrence of false alarms in the particular circumstances involved.

If the sensor 4 detects an interference with the vehicle 2 it causes the transmission means 6 to transmit a signal S1. The transmission means 6 is in wireless communication with the control unit 8. The transmission means 6 comprises a low power VHF radio frequency transmitter on an approved frequency (currently 418 MHz), the emitted signal S1 is coded to avoid interference with neighbouring signals S and to deter illegitimate attempts to interfere with the system. The coding may be factory-set or programmable.

In their operating construction the sensor 4 and the transmission means 6 are combined in a single self-contained unit; they have been described separately here for simplicity.

The ultrasonic scanner 12 and the piezo-crystal sensor 14 are included within the unit which is powered by an integral nickel-cadmium battery-pack (not shown) to enable the unit to be properly portable; the battery-pack is capable of powering the unit for between 2 and 10 days, a battery power level indicator may be included in the system. A storage rack (not shown) may be included as part of the system in to which one, or more, combined sensor/transmission units 4,6 may be deposited; the storage rack includes a trickle-type battery recharger to re-energise the battery-pack. The sensor/transmission units 4,6 include female sockets which mate with powered pins on the rack. The unit may include a light-emitting diode powered by the battery-pack to act as a further visual deterrent.

The coded signal S1 from the transmission means is received by the control unit 8 which is located remotely from the vehicle. The receiver is also of an approved type. The control unit 8 may be wall-mounted, either on the outside of a premises in a well-known burglar alarm housing, or inside a premises; the unit may also be desk-mounted or mounted in any other convenient fashion. Portable rechargeable models may be provided for domestic use. In advanced models the coded signals S are specific to certain sensors 4 enabling the actual source of the signal S1 to be uniquely identified. In some models different signals may be used to indicate whether it is the ultrasonic scanner 12 or the piezo-crystal sensor 14 that has detected the interference. In such a system the control unit 8 may be linked to a printer which generates details of the source, the time and the date of the signal S1. All of the constructions are tamper-proof.

The control unit 8 also includes switching means for arming and disarming the system. The switching means may be toggled between the armed and disarmed states using a remote-control system utilising a 418 MHz signal used with a different coding, although other well known remote control systems may be used, for instance the infra-red remote-control systems that are well known in the field of car-alarms. When the vehicle protection system is armed this is indicated by the activation of a light emitting diode.

The unit 8 is powered in its normal usage by a standard linkage to a mains (240 volts, a.c.) power supply. However, the unit may be battery powered for use in circumstances where a mains power supply is not available and, in any event, may include a 24 hour back-up battery power supply which operates in the event of a primary power failure. The battery power source (not shown) is charged from the mains power supply when connected thereto.

On receiving the coded signal S1 from the transmission means 6, the control unit 8 activates the alarm 10. The alarm 10 is a multi-stage warning and alert system comprising a first-stage alarm that occurs for a first pre-set time period, nominally 10 seconds, and a second-stage alarm that occurs for a second pre-set time period, nominally 20 minutes, if a coded signal S1 is received again within the first pre-set time period of the first-stage alarm. The unit 8 will also activate the second-stage alarm if another coded signal S is received from one of its associated sensors 4 even if that signal S is not identical to the first coded signal S1 received.

The multi-stage response allows for a first-stage that acts to warn off intruders who may be innocent prospective customers or members of the public, whilst the second-stage provides a high level of security for the vehicles.

The first-stage alarm comprises: (i) an audio warning that is emitted throughout the first pre-set time period from a siren 16; and (ii) the activation of a stroboscopic light source 18, both of which may be obtained as proprietary items. The light source 18 is a 100 Watt source that is not intended for general exterior illumination, but merely to act as a warning and to attract attention to the area.

The second-stage alarm comprises the continued emission of sound from the siren 16 and the continued activation of the stroboscopic light source 18 for the further second pre-set time period, and (at the start of the second pre-set time period) the activation of an auto-dialler 20 to alert at least one interested party, such as the owner of the vehicle 2 or the police, to the interference. Auto-diallers 20 are well known proprietary items that will automatically dial a preset number (or numbers) and deliver a pre-programmed, or pre-recorded message—the auto-dialler 18 used in the preferred embodiment of the present invention described herein dials up to four different telephone numbers in sequence.

The first and second-stage alarms are combined in the control unit 8 in the preferred construction, although they have been described as separate elements for simplicity.

The first and second-stage alarms may be improved by the addition of the following add-on features described below. The basic system includes provision for the subsequent addition of these features enabling the vehicle protection system to be targeted at a wide range of applications. The add-on features are shown using dashed lines in FIGS. 2 and 3.

The first-stage alarm improvement comprises a vocal audio warning instead of the siren audio warning (or alternatively the vocal audio warning may alternate with the siren audio warning). The vocal audio warning involves the use of a pre-recorded, or pre-programmed, message that can be relayed through a 30 Watt audio amplifier and thence through two weather-proof speakers 22 to deliver a polite warning to the intruder of the presence of the vehicle protection system and the consequences should their actions be continued.

The second-stage alarm improvement comprises the attachment to the unit 8 of a 2 kW lighting source 24 that is capable of illuminating the vehicle 2 during the second-stage alarm time period. The lighting source 24 may be turned on and off at a rate of about 80 times per minute to alert passers-by to the illuminated area and, in particular, to the intruders; it therefore acts as a powerful deterrent.

The system may be assembled in its various embodiments from materials and components that are readily available, and the actual construction of the system will be apparent from the above description to one skilled in the art.

It is to be noted that sensors 4 are installed in a plurality of vehicles and all monitored by the control unit 8 (or interfaced control units). Furthermore, the first and second pre-set time periods may be re-set if required.

Such an arrangement has the additional advantage that the sensors 4 may be grouped in to zones, a video camera may have a number of monitoring positions—preferably at least one per zone. Thus if a sensor 4 detects an interference in a zone the camera may be directed towards that zone. This arrangement reduces the need for a plurality of cameras and quickens the response time of the camera compared to a panning camera. Once again this increases the deterrent level of the system.

The vehicle protection system described above provides a high level of security whilst cutting down the number of false alarms. When the system is used to protect vehicles displayed on a point of sale forecourt the likelihood of a genuine prospective customer setting off a full scale alarm is minimised and thus the likelihood of a prospective customer being alienated by setting of an alarm is reduced.

Further examples embodying the present invention will now be described, by way of example only.

FURTHER EMBODIMENT 1

In order to provide security for guests' cars at a hotel the present invention may be provided for their use on a rental basis, a charge normally being added to the guest's bill.

In this embodiment each of the sensors 4 may selectively activated from the control unit 8, and a substantially unique signal is emitted by the respective transmission means 6 associated with each sensor 4 if an interference is affected. Thus, control may be maintained over the hired systems, for instance by ensuring that they require regular coded reactivation from the control unit 8, to minimise thefts of the systems and difficulties with over-hiring or confusions between guests. Furthermore, a signal S1 may be uniquely correlated to a known guest for readily apparent reasons of convenience and efficiency.

The control unit 8 may comprise a computer based control system that stores vehicle details (including e.g car make, car model, car colour, car registration, car location, owner and owner's whereabouts).

Other applications for this embodiment, with or without the presence of the charging element, include airports, railway stations, ports, hospitals, educational establishments, government facilities etc.

FURTHER EMBODIMENT 2

Figure 4:
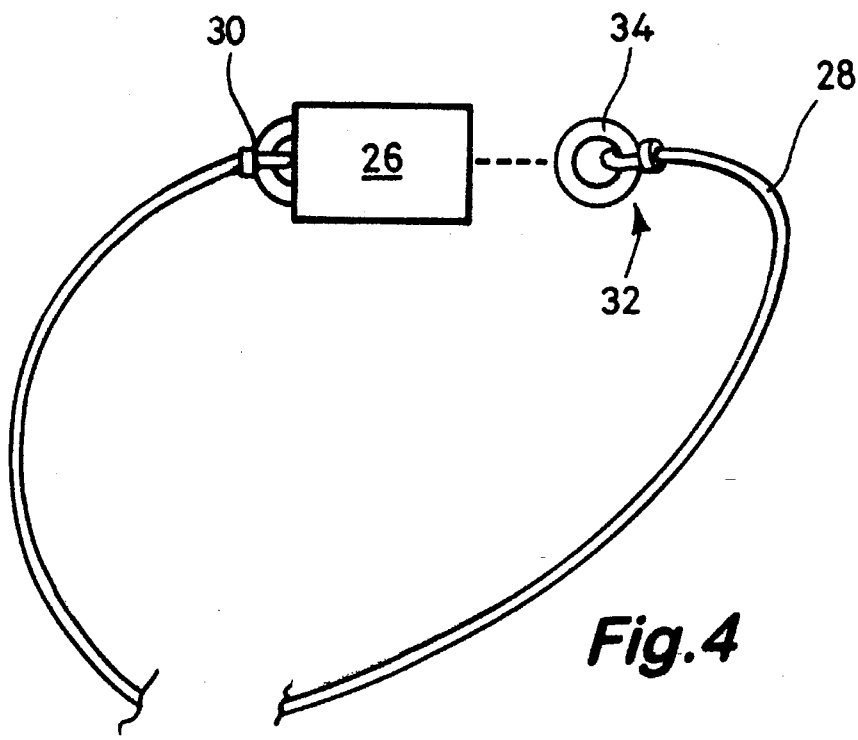
FIG. 4 is a schematic representation of a further embodiment of the present invention.

This embodiment is illustrated in FIG. 4 in which like numerals have been used to identify like parts. A combined sensor 4 and transmitter 6—for this embodiment identified as transceiver 26—is attached to one end of a length of security material 28, such as wire rope, chain or metal bar(s). The transceiver 26 may be formed or placed around the security material 28, or attached thereto (as shown) by a linkage 30 at least as strong as the material 28. The other end 32 of the material 28 includes a linkage member 34 that can be releasably attached to the transceiver 26, for instance by a padlock type linkage or an internal locking latch. The preferred construction includes a locking means within the transceiver 26 that engages the linkage member 34 and which can be opened by a key, combination and/or coded signal.

The length of security material 28, with the transceiver 26 attached, may then be threaded through, for instance, the spokes of a motor bike or the fittings of a boat's outboard motor.

The sensor 4 within the transceiver 26 may detect, for instance, a disturbance (as above), as well as the material 28 being cut, the ends of the material 28 being withdrawn from the transceiver 26 or a movement of the article being protected. On detecting such an interference the transmitter 6 is activated and the alarm sequence commences as set out above.

This embodiment may also be used to protect other vehicles, e.g caravans or boat trailers by attaching the material 28 to, or around, the toe hitch of the caravan or trailer. The transceiver 26 may alternatively be attached directly to the tow hitch.

This embodiment may also be used in the surveillance of perimeter gates, haulage containers, bicycles, secure areas and/or construction equipment.

FURTHER EMBODIMENT 3

Figure 5:
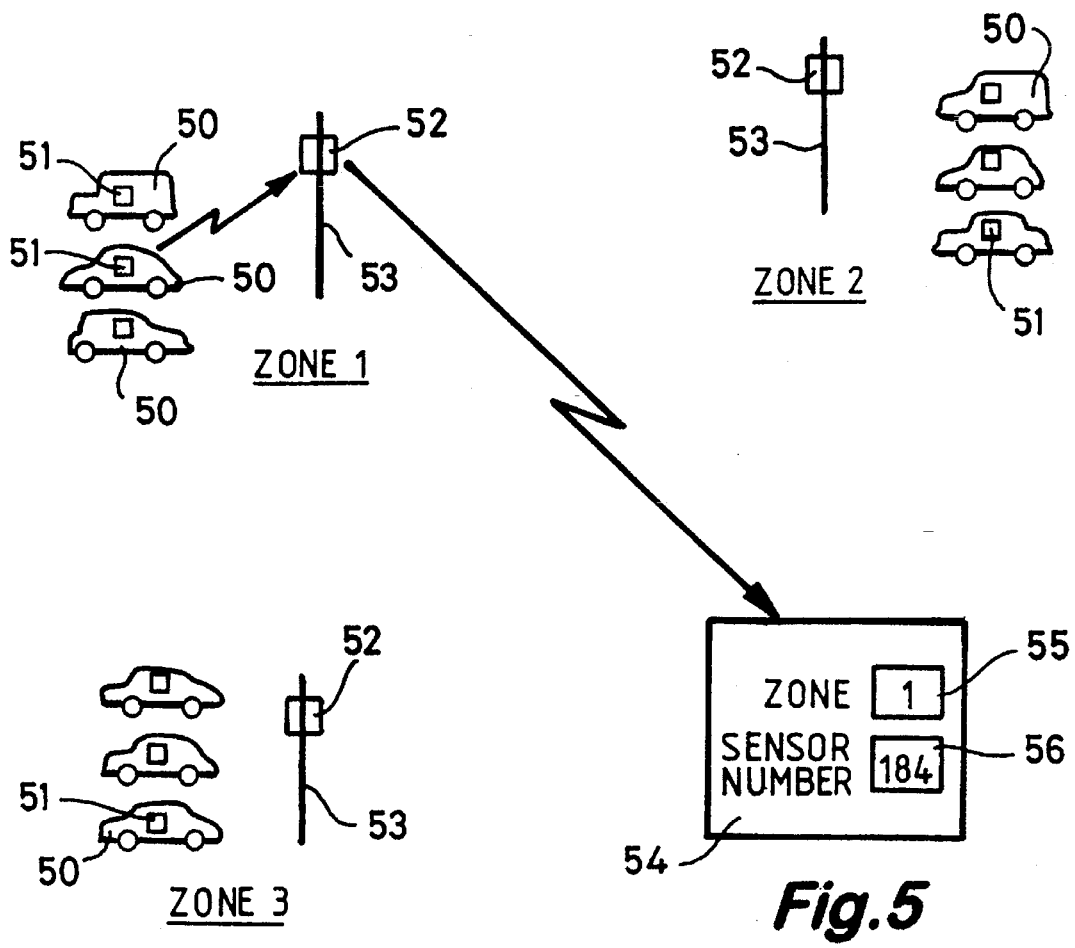
FIG. 5 is a schematic representation of yet another embodiment of the invention.

FIG. 5 illustrates a system in accordance with the invention which can be used to monitor large numbers of vehicles, for example in a car-park covering a very large area, or in several spaced car-parks. Each vehicle 50, of which only three are illustrated in each zone for clarity, is provided with a combined sensor/transmitter unit 51. The sensor includes as a detector element any one or more of a wide range of movement or heat detectors, for example a Hall Effect detector, in which movement of a magnetic element adjacent to a Hall Effect transistor produces a detectable electrical charge, a piezo-electric detector or a passive infra-red detector.

Detection of interference with a vehicle, for example giving rise to vibration, or the presence of detectable body heat from an intruder, sends a signal to a microprocessor controlling the operation of the sensor/transmitter unit. The signal causes a first code and a second code to be retrieved from a store within the unit and to be sent to the transmitter, which broadcasts an FM signal at, for example, 418 Mhz, comprising the two codes. The first code is a permanently stored system-identifying code which prevents adjacent systems interfering with each other, and the second is a user-entered unit-identifying code. This latter code is entered into the device via a keypad on the unit, with a display, for example a liquid crystal display, to show the numbers registered. The codes may be scrambled before transmission in accordance with a system key and unscrambled on receipt, as a further security measure.

In the example illustrated in FIG. 5, unit 124 in zone 1 has been caused to send a signal, and this is received by Zone 1 control unit 52, suitably mounted at an elevated point within the zone, for example on a pole 53. The control unit 52 in turn retrieves from its store an identifying code which is added to the unit code, and this is then transmitted via a 27 Mhz FM transmitter in the control unit to a central control panel 54 which could, for example, be situated at a distance of about 2 miles from Zone 1. The central control panel has displays 55 and 56 (for example liquid crystal displays), which show the Zone number and unit number identified in the received signal after unscrambling.

By this embodiment of the system an individual vehicle being interfered with can be immediately identified at a remote control centre, and security staff despatched to investigate, for example.

Each sensor/transmitter unit may be powered by a rechargeable battery, for example a nickel-cadmium battery, so that the unit is readily transportable from one vehicle to another. The zone control units 52 may also be battery powered, or may be permanently located an supplied with mains electric power.

The central control panel may also cause the sending of alarms and the initiation of other warning signals in response to receipt of a signal. For example, the panel may incorporate an auto-dialler as hereinbefore described.

I claim:

1. A vehicle site protection system for use in protecting a plurality of parked vehicles on said site from unlawful activity, the system comprising a control unit located remotely from the vehicles and arranged to activate an alarm signalling means in response to receipt of a signal from one of a plurality of free-standing wireless sensor units, each sensor unit being placed entirely within the interior of a respective one of the vehicles, each sensor unit comprising a piezocrystal motion and shock sensor, at least one of an ultrasonic scanner and an infrared detector capable of detecting motion of an object within the vehicle, a power supply, and a transmission means which is activated to send an identifying coded signal to the control unit in response to an output from the sensor, the control unit having readily programmable means for storing information relating to the vehicle's location wherein a sensor unit is located, the control unit further having display means for displaying information relating to the vehicle's location in response to an output from the sensor unit, there being no physical connection between the control unit and the transmission means, characterized in that each sensor unit is self-contained and self-powered and further characterized by each sensor unit being portable and thus readily transferable, requiring no external or internal connections, from one vehicle to another as vehicles enter and leave the site.

2. A system according to claim 1, wherein the transmission means comprises a store for storing an identifying code and means for including said code in the transmitted signal, and the control unit comprises means for detecting the code in the received signal and for activating the alarm signalling means in response to detection of the code.

3. A system according to claim 2, wherein the control means comprising a store for storing a plurality of different codes, and means for comparing the detected code with the stored codes and for activating the alarm signalling means only when the detected code matches one of the stored codes.

4. A system according to claim 2, wherein the transmission means and the control unit each comprise means for entering an identifying code into the respective store.

5. A system according to claim 4, wherein each code entering means comprises a keypad.

6. A system according to claim 5, wherein the code entering means also comprises a display means.

7. A system according to claim 2, wherein the transmission means comprises means for scrambling the code before its inclusion in the transmitted signal, and the detection means in the control unit comprises means for unscrambling the received signal to produce the code.

8. A system according to claim 2, wherein the alarm signalling means is arranged to activate an audible alarm.

9. A system according to claim 2, wherein the alarm signalling means is arranged to activate a visible warning device.

10. A system according to claim 2, wherein the alarm signalling means is arranged to activate a telephone dialling and messaging device.

11. A system according to claim 2, comprising a plurality of said control units, each arranged to receive signals from any of a plurality of sensor units within a respective zone, and each capable of communicating with a control alarm signalling means in a manner not requiring a physical connection between the control unit and the control alarm signalling means.

12. A system according to claim 11, wherein each control unit is adapted to transmit an identifying signal to the central alarm signalling means comprising a first code identifying the control unit and a second code identifying the sensor signalling.

* * * * *